United States Patent Office 3,772,225
Patented Nov. 13, 1973

3,772,225
POLYUREIDE-FORMALDEHYDE RESINS AND
PROCESSES FOR MAKING AND USING SAME
Robert Paul Avis, West Chester, Pa., assignor to Scott
Paper Company, Delaware County, Pa.
No Drawing. Continuation of abandoned application Ser.
No. 866,387, Oct. 14, 1969. This application Nov. 19,
1971, Ser. No. 200,588
Int. Cl. C08g 9/00, 9/08
U.S. Cl. 260—17.3
9 Claims

ABSTRACT OF THE DISCLOSURE

A water-soluble, cationic, thermosetting, polyureide-formaldehyde resin condensate is formed by reacting a polyalkylene polyamine with a urea to form a polyureide intermediate, then quenching the polyureide-forming reaction with an organic hydroxyl-containing compound, and then finally reacting the quenched polyureide intermediate with formaldehyde to form the water soluble, cationic, thermosetting resin product. The product is useful as a wet-strength additive in paper and as the resin component in aqueous printing fluids which are, in turn, useful in the high speed printing or decorating of absorbent papers.

CROSS REFERENCES TO RELATED APPLICATIONS

This application is a continuation of U.S. patent application Ser. No. 866,387 filed on Oct. 14, 1969 which is now abandoned.

BACKGROUND OF THE INVENTION

Field of the invention

This invention relates to novel, water-soluble, cationic thermosetting polyureide-formaldehyde resin condensates to a process for preparing such resins, to a process for employing these resins in the manufacture of wet-strengthened paper, to the wet-strengthened paper comprising these resins as a wet-strength aditive, to aqueous printing fluids comprising such resins as a binder component, and to absorbent papers printed with said fluids.

Description of the prior art

There are a multitude of water-soluble, cationic, thermosetting resins disclosed in the prior art, including a number of such resins which are specifically designed for use as wet-strength additives in paper-making processes (cf., for example, U.S. Pats. 2,345,543; 2,485,079; 2,485,-080; 2,554,475; 2,683,134; 2,699,435; 2,769,799; 2,926,-116; 2,926,154; 3,060,156; 3,086,961; 3,207,656; 3,216,-979; 3,250,664; 3,275,605; 3,320,215; 3,420,735; and the like). In many instances, however, these prior art resins have a tendency to gell on standing, unless they were maintained as very dilute solutions, and in a number of other instances the resins, in the presence of water, tend to depolymerize or degrade, resulting in a decrease in viscosity and a loss of efficiency as wet-strength additives.

SUMMARY OF THE INVENTION

The novel, water-soluble, cationic, thermosetting resins of this invention are prepared by reacting a polyalkylene polyamine with a urea to form a polyureide intermediate, quenching the polyureide-forming reaction with an organic, hydroxyl-containing compound, and then reacting the quenched polyureide intermediate with formaldehyde to form a water-soluble, cationic, thermosetting, polyureide-formaldehyde resin condensate. Aqueous solutions of the resulting polyureide-formaldehyde resin condensate are highly stable solutions, even in relatively high concentrations (e.g., solutions having concentrations of approximately 30% non-volatile solids [N.V.S.]), and these polyureide-formaldehyde condensates have been proven to be useful as wet-strength additives in paper-making processes to impart wet-strength to papers obtained therefrom.

DESCRIPTION OF THE PREFERRED EMBODIMENTS

As indicated above, the polyureide-formaldehyde resin condensates of this invention are prepared by reacting a polyalkylene polyamine with a urea to form a relatively high molecular weight polyureide intermediate, then quenching the polyureide-forming reaction with an organic hydroxyl-containing compound, and then finally reacting the quenched polyureide intermediate with formaldehyde to form a water soluble, cationic, thermosetting polyureide-formaldehyde resin condensate. Without wishing to be bound by any particular theory or structure, it has been found that quenching the polyureide-forming reaction with an organic hydroxyl-containing compound prevents or at least minimizes the degradation or hydrolysis of the polyureide intermediate, thereby providing a relatively high molecular weight polymeric backbone for further reaction with formaldehyde, in order to provide a highly stable polyureide-formaldehyde resin condensate.

The polyalkylene polyamines which are useful in preparing the polyureide-formaldehyde resin condensates of this invention are represented by the general formula

$$NH_2(RNH)_nH$$

wherein R is an alkylene group containing from 2 to about 8 carbon atoms, but preferably up to about 4 carbon atoms, and $n$ is an integer of from 2 to about 5. Illustrative of such polyalkylene polyamines are compounds such as polyethylene polyamines (e.g. diethylene triamine, triethylenetetramine, tetraethylene pentamine, and the like), polypropylene polyamines (e.g. dipropylene triamine, and the like) and polybutylene polyamines (e.g. dibutylene triamine), including mixtures thereof.

The organic hydroxyl-containing compounds employed to quench the polyureide-forming reaction include those compounds which, an aqueous media, exist in a hydrated form, (e.g. compounds such as formaldehyde, which in water exists as formaldehyde hydrate (methylene glycol), and are illustrated by compounds such as formaldehyde, paraformaldehyde, aliphatic alcohols, e.g. methyl alcohol, ethyl alcohol, normal propyl alcohol, isopropyl alcohol, tertiary butyl alcohol, and the like), aliphatic polyols (e.g. ethylene glycol, glycerine, diethylene glycol, triethylene glycol, and the like), simple sugars or hexoses (e.g. glucose, and the like), simple sugar alcohols (e.g. sorbitol, and the like), and anhydrides of simple sugar alcohols (e.g. sorbitan, and the like).

In the initial step of the process employed in preparing the polyureide-formaldehyde resin condensates of this invention, the polyalkylene polyamine is reacted with urea in mole ratio of from about 0.1 to about 1.0 moles of amine per mole of urea, with a ratio of from about 0.2 to about 0.4 moles of amine per mole of urea being preferred.

At atmospheric pressures, the polyureide-forming reaction is conducted at temperatures of from about 110° C. to about 180° C., with temperatures of from about 130° C. to about 150° C. being preferred. The reaction mixture is usually taken slowly up to the desired reaction temperature over a period of from about one to about four hours, and then held at the desired reaction temperature for a period of from 15 minutes to about an hour. Upon heating the reaction mixture up to the desired reaction temperature, the ammonia by-product can initially be observed evolving at around 95° C., with maximum evolution of ammonia taking place at temperatures of from about 110° C. to about 130° C.

After conducting the polyureide-forming reaction for the desired length of time, the reaction mixture is then quenched by the addition of the organic hydroxyl-containing compound. When the organic, hydroxyl-containing compound is a relatively low boiling compound, for example, a formaldehyde, an alcohol, or an aqueous solution of a sugar, a sugar alcohol or an anhydride of a sugar alcohol, the reaction mixture should be cooled to a temperature of about 120° C. before adding the organic hydroxyl-containing compound. If, however, a polyol is employed to quench the polyureide-forming reaction, these quenching agents can be added directly to the polyureide-forming reaction mixture without first cooling down the reaction mixture.

As indicated above, the use of organic, hydroxyl-containing compounds to quench the polyureide-forming reaction prevents or at least minimizes the degradation or hydrolysis of the polyureide intermediate, thereby providing a relatively high-molecular weight polymeric backbone for further reaction with formaldehyde to form the polyureide-formaldehyde condensation products of this invention. Evidence of this can be seen in the following table, wherein the various polyureide intermediates were made under essentially the same reaction conditions (i.e., same mole ratios of polyalkylene polyamine to urea, same reaction times and temperatures, etc.), but were quenched with the same volumes of (1) water, (2) aqueous formaldehyde, and (3) ethylene glycol:

TABLE 1

| Sample | Quenching Agent | Percent (by weight) of non-volatile solids in the quenched product | Viscosity (centistokes at 25° C.) |
|---|---|---|---|
| 1 | Water | 77.0 | 587 |
| 2 | 37% formaldehyde | 77.1 | 22,980 |
| 3 | Ethylene glycol | Diluted with water to 77.0. | 235,626 |

Since viscosity is a function of molecular weight, it should be apparent that the process of this invention provides a higher molecular-weight polyureide intermediate for further condensation with formaldehyde than does a process wherein water is employed to quench the polyureide-forming reaction.

After quenching the polyureide-forming reaction with the organic, hydroxyl-containing compound, the quenched polyureide reaction mixture is then further reacted with formaldehyde to form the polyureide-formaldehyde resin condensates of this invention. From about 1.0 to about 3.0 moles of formaldehyde per mole of the urea used to form the polyureide is preferred, with from about 1.5 to about 2.2 moles per mole of the urea used to form the polyureide being particularly preferred. This third step of the process of this invention is usually conducted in two stages, the first being the methylolation of the quenched polyureide intermediate and the second being the condensation of the methylolated intermediate. The methylolation stage is carried out at a temperature of from about 65° C. to about 85° C. and at a pH of from about 8.0 to about 9.5 for from about 10 to about 30 minutes; and the final condensation stage is conducted at a temperature of from about 65° C. to about 80° C. and at a pH of from about 4.5 to about 5.5 for from about 30 to about 120 minutes. A mineral acid such as phosphoric acid can be employed to lower the pH for the final condensation stage; and the condensation stage is usually conducted until the solution of the polyureide-formaldehyde resin condensate becomes a viscous syrup at the point of incipient gellation, at which time the condensation reaction is terminated by diluting the reaction mixture with water, aqueous formaldehyde or alcohol and adjusting the pH to from about 6.0 to about 7.0 with alkali. The resulting polyureide-formaldehyde resin condensate should have a viscosity of from about 25 to about 70 centistokes at 25° C. and approximately 30% by weight of non-volatile solids. If a higher efficiency resin is desired, the dilution of the solution of the polyureide-formaldehyde resin condensate with water, aqueous formaldehyde or alcohol prior to neutralization can be performed several times, allowing the viscosity of the solution to again build after each dilution but the last to a point of incipient gallation, thereby providing a final polyureide-formaldehyde resin condensate of greater efficiency and higher molecular weight.

Evidence of the improved stability of the polyureide-formaldehyde resin condensates of the present invention over those prepared by a process wherein water is employed to quench the polyureide-forming reaction can be seen in the following table. The resin identified as Resin No. 1 was made from a water quenched polyureide intermediate having a relatively low-molecular weight, whereas the resin identified as Resin No. 2 was prepared in accordance with the process of this invention.

TABLE 2

| | Viscosity in centistokes at 25° C. | | | | | | | |
|---|---|---|---|---|---|---|---|---|
| Weeks of aging | 0 | 0.25 | 0.5 | 1.0 | 2.0 | 3.0 | 4.0 | 5.0 |
| Sample: | | | | | | | | |
| Resin No. 1 | 51.4 | 38.0 | 31.1 | 28.1 | 26.3 | 29.1 | 30.2 | 34.0 |
| Resin No. 2 | 54.9 | 55.0 | 55.3 | 46.8 | 44.2 | 45.1 | 50.4 | 55.8 |

As can be seen from the table, both of the resins initially have properties which are substantially the same, thereby enabling both to be employed as the resin component in aqueous fluids designed for the high-speed printing of absorbent paper webs under substantially the same operating conditions. After a few days, however, Resin No. 1 has depolymerized to a point where the initial operating conditions would have to be modified in order for the resin to be operable in such fluids (e.g. lowering the pH of the fluid wherein the resin is employed, etc.), and within a week this resin has depolymerized to a point wherein a fluid comprising this resin is no longer a commercially acceptable fluid. On the other hand, Resin No. 2 maintains its viscosity over the entire five week period, thereby providing a fluid comprising this resin which can be employed under substantially the same operating conditions over the entire period.

The following specific examples are set forth primarily for the purpose of illustrating the present invention, and are not intended to limit the scope thereof in any way. All parts or percentages set forth in these examples are parts or percentages by weight, and not by volume, unless the contrary is clearly expressed therein.

EXAMPLE I

Two hundred and twenty grams of urea and one hundred and forty-eight grams of a mixture of amines consisting of 66⅔% triethylene-tetramine and 33⅓% diethylenetriamine were placed in a 3-neck flask equipped with a mechanical stirrer, thermometer and condenser. The mixture was slowly heated over a 96 minute period to a temperature of 148 to 150° C. and held at this temperature for a 15 minute period. The reaction mixture containing the resulting polyureide intermediate was then cooled to 127° C. and quenched with 100 ml. of aqueous 37% formaldehyde solution. A sample of the quenched polyureide had a viscosity of 30,600 centistokes at 25° C., a nonvolatile solids content of 77.5%, and a pH of 8.9. The quenched polyureide was further cooled to 80° C. and an additional 460 grams of aqueous 37% formaldehyde solution were then added to continue the methylolation of the polyureide intermediate at a pH of 8.5 and at a temperature of 80° C. for a ten minute period. The reaction mixture containing the quenched polyureide intermediate was then cooled to 75° C., and the pH of the mixture was adjusted to 5.5 with a solution of 18.4 ml. of 85% phosphoric acid and 27.6 ml. water. The reaction temperature was kept between 75° C. and 80° C. until the resin solution became a viscous syrup at the point of incipient gelation (52 minutes), then 101 ml. of aqueous 37% formaldehyde solution, 475 ml.

of water, and 78 ml. of 10% aqueous sodium hydroxide were added. The resulting reaction mixture was then cooled to room temperature to provide an aqueous solution of a polyureide-formaldehyde resin condensate having a viscosity of 49.5 centistokes at 25° C., a pH of 6.3, and a nonvoltaile solids content of 29.5%.

EXAMPLE II

Two hundred and twenty grams of urea and one hundred and forty-eight grams of an amine mixture consisting of 33⅓% diethylenetriamine and 66⅔% triethylenetetramine were placed in a 3-neck flask equipped with a mechanical stirrer, thermometer, and condenser. The mixture was slowly heated over a 64 minute period to a temperature of 145° C. to 150° C. and held at this temperature for a 15 minute period. The resulting reaction mixture containing the resulting polyureide intermediate was then cooled to 135° C. and quenched with 100 cc. of ethylene glycol. A sample of the quenched polyureide intermediate had a viscosity of 409,988 centistokes at 25° C., a nonvolatile solids content of 79.5%, and a pH of 11.0.

102.0 grams of aqueous 37% formaldehyde were then added to 101.5 grams of the quenched polyureide intermediate and the resulting reaction mixture was then heated to 80° C. for 20 minutes at a pH of 9.0 to fully methylolate the quenched polyureide reaction intermediate. The resulting reaction mixture was then cooled to 70° C. and the pH of the mixture was adjusted to 5.5 with a solution of 4.6 cc. 85% phosphoric acid and 6.5 cc. of water. The reaction temperature was kept at 70° C. until the resin solution changes to a viscous syrup at a point of incipient gelation (65 minutes); and then 22 cc. of aqueous 37% formaldehyde solution, 103 cc. of water, and 17 cc. of aqueous 10% sodium hydroxide were added. The resulting reaction mixture was then cooled to room temperature to provide an aqueous solution of a polyureide-formaldehyde resin condensate having a viscosity of 57.8 centistokes at 25° C., a pH of 6.4, and a nonvolatile solids content of 34.3%.

EXAMPLE III

Although the resins made in accordance with the foregoing Examples I and II are usually employed as beater-additive types of wet strength resins, they may also be used to impregnate a paper sheet by immersion, spraying, etc. After such treatments the paper sheet may be further processed to cure the resin. Normally, this resin is self-curing at the proper pH and no extra treating step is needed. As indicated above, these resins are preferably incorporated into pulp by adding such resins to the aqueous suspension of paper stock or furnish in the beater stock chest, Jorden engine, fan pump, headbox or at any other suitable point ahead of the wire or sheet forming stage of a paper-making process.

An advantageous amount of resin added to the paper sheet constitutes about 0.1% to about 5% is preferred. However, the amount may be varied to suit the particular need.

Paper and pulp slurries having a pH below about 7.0 may be effectively treated with these novel resins. Representative data obtained by using these novel resins are illustrated in the following table:

| Type of resin | Percent (by weight) of resin added, based on the bone-dry weight of pulp | Wet tensile, oz./in. | Dry tensile, oz./in. | Percent wet tensile to dry tensile |
|---|---|---|---|---|
| Resin of Ex. I | 0.5 | 39.3 | 171.0 | 23.0 |
| Do | 1.0 | 49.4 | 174.0 | 28.4 |
| Do | 2.0 | 73.6 | 176.8 | 41.6 |
| Resin of Ex. II | 0.5 | 35.4 | 181.9 | 19.5 |
| Do | 1.0 | 45.0 | 194.7 | 23.1 |
| Do | 2.0 | 69.7 | 199.2 | 35.0 |
| Control (no resin) | 0.0 | 3.6 | 136.5 | 2.6 |

The wet-strengthened sheets in the above table were prepared on a Noble and Wood Handsheet machine from bleached West Coast sulfite pulp having a Canadian freeness of 450–500 cc., and the pulp slurry was adjusted to a pH of 4.0 with sulfuric acid. After formation, the sheets were oven cured for 30 minutes at 110° C., and were conditioned before measurements were made on a Thwing-Albert Tensile tester according to the standard TAPPI method T456m–49.

What is claimed is:
1. In a process for preparing a water-soluble, cationic, thermosetting resin which comprises:
  (A) reacting a polyalkylene polyamine, having the general formula $NH_2(RNH)_nH$ wherein R is an alkylene group containing from 2 to about 8 carbon atoms and $n$ is an integer of from 2 to about 5, with an urea to form a polyureide intermediate;
  (B) quenching the polyureide-forming reaction; and
  (C) reacting the quenched polyureide intermediate with formaldehyde to form a water-soluble, cationic, thermosetting polyureide formaldehyde resin condensate, the improvement which comprises quenching the polyureide-forming reaction with at least one organic, hydroxyl-containing compound selected from the group consisting of formaldehyde, paraformaldehyde, aliphatic alcohols, aliphatic polyols, simple sugars, simple sugar alcohols and anhydrides of simple sugar alcohols.

2. A process as claimed in claim 1 wherein the polyalkylene polyamine is at least one member of the group consisting of polyethylene polyamines, polypropylene polyamines and polybutylene polyamines.

3. A process as claimed in claim 2 wherein a reaction mixture containing from about 0.1 mole to about 1.0 mole of polyalkylene polyamine per mole of urea is heated up to a reaction temperature of from about 110° C. to about 180° C. over a period of from one to about four hours and then held at the reaction temperature for a period of from about 15 minutes to about one hour to form the polyureide intermediate, the polyureide-forming reaction is quenched with an organic, hydroxyl-containing compound, and then the quenched polyureide intermediate is reacted with from about 1.0 to about 3.0 moles of formaldehyde per mole of the urea used to form the intermediate to form the polyureide-formaldehyde resin condensate.

4. A process as claimed in claim 3 wherein a reaction mixture containing from about 0.2 to about 0.4 mole of polyalkylene polyamine per mole of urea is heated up to a reaction temperature of from about 130° C. to about 150° C. over a period of from about one to about four hours and then held at the reaction temperature for a period of from about fifteen minutes to about one hour to form the polyureide intermediate, the polyureide-forming reaction is quenched with an organic, hydroxyl-containing compound, and then the quenched polyureide intermediate is reacted with from about 1.5 to about 2.2 moles of formaldehyde per mole of the urea used to form the intermediate to form the polyureide-formaldehyde resin condensate.

5. A process as claimed in claim 4 wherein the reaction of the formaldehyde with the quenched polyureide intermediate is a two-stage reaction comprising:
  (A) the methylolation of the quenched polyureide intermediate at a temperature of from about 65° C. to about 85° C. and at a pH of from about 8.0 to about 9.5 for a period of from about 10 minutes to about 30 minutes, and
  (B) the condensation of the methylolated polyureide intermediate at a temperature of from about 65° C. to about 80° C. and at a pH of from about 4.5 to about 5.5 for a period of from about 30 minutes to about 120 minutes.

6. A process as claimed in claim 5 wherein the pH is lowered for the condensation stage by the addition of a mineral acid to the reaction mixture, and wherein the condensation stage of the reaction is terminated by diluting the reaction mixture with water, aqueous formaldehyde, or alcohol and adjusting the pH of the diluted reaction mixture to a pH of from about 6.0 to about 7.0 by the addition of alkali to the diluted reaction mixture.

7. A process as claimed in claim 6 wherein a mixture of triethylene tetramine and diethylene triamine are reacted with urea to form the polyureide intermediate and the polyureide-forming reaction is quenched with an aqueous formaldehyde solution.

8. A process as claimed in claim 6 wherein a mixture of triethylene tetramine and diethylene triamine are reacted with urea to form the polyureide intermediate and the polyureide-forming reaction is quenched with ethylene glycol.

9. The product of the process claimed in claim 1.

References Cited

UNITED STATES PATENTS

| | | | |
|---|---|---|---|
| 2,616,874 | 11/1952 | Yost et al. | 260—70 R |
| 3,275,605 | 9/1966 | Eastes et al. | 260—70 R |
| 2,689,239 | 9/1954 | Melamed | 260—69 |
| 2,696,504 | 12/1954 | Yost et al. | 260—70 R |

WILLIAM H. SHORT, Primary Examiner

E. WOODBERRY, Assistant Examiner

U.S. Cl. X.R.

162—167; 260—69 R, 70 R, 72 R

UNITED STATES PATENT OFFICE
CERTIFICATE OF CORRECTION

Patent No. 3,772,225      Dated November 13, 1973

Inventor(s)   Robert Paul Avis

It is certified that error appears in the above-identified patent and that said Letters Patent are hereby corrected as shown below:

Column 1, line 41, "aditive" should read -- additive --. Column 2, line 43, "an" should read -- in --. Column 3, line 29, after "(2)" insert -- 37% --. Column 4, line 6, "gallation" should read -- gellation --. Column 5, line 10, "66-2/3" should read -- 66-2/3% --.

Signed and sealed this 16th day of July 1974.

(SEAL)
Attest:

McCOY M. GIBSON, JR.     C. MARSHALL DANN
Attesting Officer        Commissioner of Patents